United States Patent Office 3,660,342
Patented May 2, 1972

3,660,342
PREPARATION OF 1,3-DIENES
John C. Duggan, Chicago, Ill., assignor to Monsanto Company, St. Louis, Mo.
No Drawing. Filed Dec. 22, 1970, Ser. No. 100,784
Int. Cl. C07c 3/10
U.S. Cl. 260—666 A     3 Claims

ABSTRACT OF THE DISCLOSURE

The invention relates to the preparation of 1-vinylcyclohexene and other 1,3-dienes by an isomerization and pyrolysis process.

---

The present invention relates to the preparation of 1-vinylcyclohexene and other 1,3-dienes.

While certain 1,3-dienes are readily available, there are many others that are difficult of access. For example, the known routes to 1-vinylcyclohexene either give low yields, as in the method which invloves hydrogenation and dehydration of 1-ethynylcyclohexanol, or require the addition of extremely expensive reagents, such as vinyl magnesium bromide to cyclohexanone.

It has been found that 1,3-dienes may be converted into isomeric 1,3-dienes by a novel procedure. For example, 1,3-cyclooctadiene may be converted to 1-vinylcyclohexene. Since the former is easily prepared from 1,3-butadiene, this represents a very attractive route to the latter.

The process of the present invention involves three stages, some of which may be combined. First the octadiene is photochemically converted to an isomer, bicyclooctene. The latter is then isomerized to a different isomeric bicyclooctene, which is pyrolyzed to the desired diene. In the case of the preparation of 1-vinylcyclohexene, cis-cis-1,3-cyclooctadiene is photochemically converted, by a known procedure, to bicyclo[4.2.0]octene-7. The latter is catalytically isomerized to bicyclo[4.2.0]octene-8, a new compound, which is then pyrolyzed, in the same or in a subsequent step, to 1-vinylcyclohexene.

The 1-vinylcyclohexenes obtained in the practice of this invention have the general formula

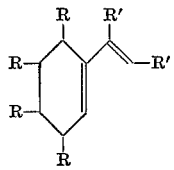

where R=hydrogen, hydrocarbyl having from one to six carbons, OH, OCH$_3$, OCOCH$_3$, and R'=H, and hydrocarbyl having from one to six carbons.

The photocyclization of dienes to cyclobutenes is a familiar and general reaction. In the particular case of 1,3-cyclooctadiene, bicyclo[4.2.0]octene-7 is obtained efficiently and in good yield.

The isomerization of one bicyclooctene into another involves hydrogen transfer (inter- or intramolecular) and may be catalyzed by any of a large number of catalysts, separately or in combination. Preferred catalysts are strong bases such as potassium t-butoxide or lithium dimethylamide; acids, of both protonic and Lewis types, such as perchloric acid, phosphoric acid, sulfuric acid and alumina; and transition metals such as iron, cobalt, nickel, ruthenium, rhodium, palladium, osmium, iridium and platinum or their derivatives in solution.

The metals may be employed in elemental form or as the halides such as chlorides, bromides and iodides, sulfates, nitrates, oxides, etc., as well as in the form of complexes such as organic complexes having a variety of ligands. Examples of such compounds, exemplified, particularly with respect to the noble metals are set forth below.

Rh metal
RhCl$_3$
RhBr$_3$
RhI$_3$
RhCl$_3$·3H$_2$O
Rh$_2$(CO)$_4$Cl$_2$
Rh$_2$(CO)$_4$Br$_2$
Rh$_2$(CO)$_4$I$_2$
Rh$_2$(CO)$_8$
Rh[(C$_6$H$_5$)$_3$P]$_2$(CO)I
Rh[(C$_6$H$_5$)$_3$P]$_2$(CO)Cl
RhCl[(C$_6$H$_5$)$_3$P]$_2$(CH$_3$I)$_2$
Rh(SnCl$_3$)[(C$_6$H$_5$)$_3$P]$_3$
RhCl(CO)[(C$_6$H$_5$)$_3$As]$_2$
RhI(CO)[(C$_6$H$_5$)$_3$Sb]$_2$ Ir metal
IrCl$_3$
IrBr$_3$
IrI$_3$
IrCl$_3$·4H$_2$O
IrBr$_3$·4H$_2$O
Ir(CO)$_3$Cl
Ir(CO)$_3$Br
Ir$_2$(CO)$_4$I$_2$
Ir$_2$(CO)$_8$
Ir[(C$_6$H$_5$)$_3$P]$_2$(CO)I
Ir[(C$_6$H$_5$)$_3$P]$_2$(CH$_3$I)$_2$
Ir(SnCl$_3$)[(C$_6$H$_5$)$_3$P]$_3$
IrCl(CO)[(C$_6$H$_5$)$_3$As]$_2$
IrI(CO)[(C$_6$H$_5$)$_3$Sb]$_2$
Ir[(C$_6$H$_5$)$_3$P]$_2$(CO)Cl IrCl[(C$_6$H$_5$)$_3$P]$_3$H$_2$

[Pt(CO)I$_2$]$_2$
[Pd(CO)Cl$_2$]$_2$
Pt(CO)$_2$Cl$_4$

Pd[(C$_6$H$_5$)$_3$P]$_2$I$_2$

Pt[(C$_6$H$_5$)$_3$As](CO)I$_2$

Pd[(C$_6$H$_5$)$_3$P]$_2$(CO)Br
Pt[(C$_6$H$_5$)$_3$As]$_2$Cl$_2$
Pd[(n-C$_4$H$_9$)$_3$P]$_2$I$_2$
Pt(CH$_3$)[P(C$_2$H$_5$)$_3$]$_2$I
Pd metal
Pt metal
Pd(NO$_3$)$_2$
PtO$_2$
RuCl$_3$
RuBr$_3$
RuI$_3$
Ru(CO)$_2$I$_2$
Ru$_3$(CO)$_{12}$
RuCl$_2$(CO)[(C$_6$H$_5$)$_3$P]$_3$
RuI$_2$(CO)[(C$_6$H$_5$)$_3$As]$_3$
RuBr$_2$(CO)[(n-C$_6$H$_9$)$_3$P]$_3$
RuBr$_3$(CO)[(C$_6$H$_5$)$_3$P]$_2$
Ru$_2$O$_3$
OsO$_2$
OsO$_4$
K$_2$[Ru$_2$(SnCl$_3$)$_2$]
Os(CO)$_4$X$_2$ where X=Cl, Br, I

[(n-C$_4$H$_9$)N][Rh(CO)$_2$X$_2$] where X=Cl$^-$, Br$^-$, I$^-$
[(n-C$_4$H$_9$)$_4$As]$_2$[Rh$_2$(CO)$_2$Y$_4$] where Y=Br$^-$, I$^-$
[(n-C$_4$H$_9$)$_4$P][Rh(CO)I$_4$]
Rh[C$_6$H$_5$)$_3$P](CO)Br
Rh[(n-C$_4$H$_9$)$_3$P]$_2$(CO)Br
RhBr[(C$_6$H$_5$)$_3$P]$_3$
Rh[(C$_6$H$_5$)$_3$P]$_3$
RhCl[(C$_6$H$_5$)$_3$P]$_3$
RhCl[(C$_6$H$_5$)$_3$P]$_3$H$_2$
[(C$_6$H$_5$)$_3$P]$_3$Rh(CO)H
Rhl[(C$_2$H$_4$)$_2$Cl]$_2$
K$_4$Rh$_2$Cl$_2$(SnCl$_3$)$_4$
K$_4$Rh$_2$Br$_2$(SnBr$_3$)$_4$
K$_4$Rh$_2$I$_2$(SnI$_3$)$_4$
Rh$_2$O$_3$
Rh(NO$_3$)$_3$
[(n-C$_4$H$_9$)N][Ir(CO)$_2$X$_2$] where X=Cl$^-$, Br$^-$, I$^-$
[(n-C$_4$H$_9$)$_4$As]$_2$[Ir$_2$(CO)$_2$Y$_4$] where Y=Br$^-$, I$^-$
[(n-C$_4$H$_9$)$_4$P][Ir(CO)I$_4$]
Ir[(C$_6$H$_5$)$_3$P]$_2$(CO)Br
Ir[(n-C$_4$H$_9$)$_3$P]$_2$(CO)Br
Ir[(n-C$_4$H$_9$)$_3$P]$_2$(CO)I
IrBr[(C$_6$H$_5$)$_3$P]$_3$
IrI[(C$_6$H$_5$)$_3$P]$_3$
IrCl[(C$_6$H$_5$)$_3$P]$_3$
[(C$_6$H$_5$)P]$_3$Ir(CO)H
Ir](C$_2$H$_4$)$_2$Cl]$_2$
K$_4$Ir$_2$Cl$_2$(SnCl$_3$)$_4$
K$_4$Ir$_2$Br$_2$(SnBr$_3$)$_4$
K$_4$Ir$_2$I$_2$(SnI$_3$)$_4$
IrO$_2$, Ir$_2$O$_3$
K$_3$Ir(NO$_2$)$_6$ Ir(CO)$_2$(CH$_3$CCH$_2$CCH$_3$)
            ‖   ‖
            O   O PdO and PtO
[(n-C$_4$H$_9$)$_4$N][Pt(CO)X$_3$] where X=Cl, Br, I
[(n-C$_4$H$_9$)$_4$As]$_2$[PtX$_4$] where X=Cl, Br, I
[(n-C$_4$H$_9$)$_4$P]$_2$[PdX$_4$] where X=Cl, Br, I
[(C$_2$H$_5$)$_3$P]$_2$PtCh$_3$I
[P(C$_6$H$_5$)$_3$]$_2$Pt(SnBr$_3$)$_2$
[(C$_6$H$_5$)$_3$PCH$_3$]$_2$PtCl$_2$(SnCl$_3$)$_2$
Pd[(n-C$_4$H$_9$)$_3$P](CO)Cl$_2$
[(C$_6$H$_5$)$_3$P](CO)Cl$_2$Pd
[(C$_6$H$_5$)$_3$As]$_2$PtCl(SnCl$_3$)

OsX$_3$ and OsX$_4$ where X=Cl, Br, I
Os(CO)$_5$ and Os$_3$(CO)$_{12}$
OsCl$_3$(CO)[(n-C$_4$H$_9$)$_3$P]$_2$
OsBr$_3$[(C$_6$H$_5$)$_3$As]$_3$
OsBr$_2$[(C$_6$H$_5$)$_3$P]$_3$
OsI$_2$[(C$_6$H$_5$)$_3$P]$_3$
Os metal
Ru metal The temperatures required to pyrolyze bicyclooctenes to 1,3-dienes vary over a wide range, e.g., 100° C. to 300° C. This is exploited to advantage in the present invention in choosing the conditions for the bicyclooctene interconversion. Suppose, for example, a readily accessible bicyclooctene is thermodynamically and kinetically stable with respect to a bicyclooctene which yields a desirable diene. Then the isomerization is carried out at temperatures high enough for the product bicyclooctenes to be pyrolyzed as soon as they are formed so that the equilibrium of the bicyclooctenes is never established. If, on the other hand, the starting bicyclooctene is less stable both thermodynamically and kinetically, it is advantageous to operate the reactor at low temperatures and then to pyrolyze the product in a second stage. The preparation of 1-vinylcyclohexene is an example of the most favorable situation where the desired bicyclo[4.2.0]-octene-8 is both more stable thermodynamically and less stable kinetically than the starting bicyclo[4.2.0]octene-7.

The choice of catalyst is determined by the temperature at which the reactor is to be maintained in the isomerization stage, which is conducted in the temperature range of 0° C. to 300° C. For low temperature isomerizations in the lower part of the temperature range, a particularly active catalyst may be chosen for ex. hydrido-carbonyl-tris(triphenylphosphine) rhodium (I) in solution or sodium metal on alumina. For higher temperature reactions, less active catalysts such as alumina per se, are adequate and have the added advantage of thermal stability.

A wide variety of reactors are suitable since both the bicyclooctene interconversion and the pyrolysis may be carried out in either liquid or vapor phases, e.g., an autoclave or continuous tube for the liquid phase reaction, and a hot tube or fluid catalyst bed for a vapor phase reaction. Moreover the catalyst for the isomerization may be either heterogeneous or homogeneous.

EXAMPLE 1

This example shows the preparation of bicyclo[4.2.0]-octene-8 using chlorotris(triphenylphosphine) - rhodium (I) as the catalyst. The latter (20 mg.) is introduced, under nitrogen, into a refluxing solution of bicyclo[4.2.0]-octene-7, (10 g.) in 2:1 benzene-ethanol (200 ml.). The solution is maintained at reflux for four hours. Gas-liquid chromatography (GLC) and n.m.r. analysis then show 80% conversion of starting material to bicyclo[4.2.0]-octene-8. Gas-liquid chromatography (GLC) analysis made use of the quantitative pyrolysis of the product to 1-vinylcyclohexene, which has a longer retention-time than bicyclo[4.2.0]octene-7. Thus with the injection port of the chromatograph at 300°, and the column (8 ft., 0.2% silicone coating; ov 17 on 60–80 mesh glass beads) at 50°, two well-separated peaks are observed. The n.m.r. analysis is based on comparison of the sharp singlet at 6.3 δ from the two vinyl hydrogens of the starting material with the broad singlet at 5.8 δ from the single vinyl hydrogen of the product. The volatile components of the solution are removed from the catalyst residue by rapid distillation under reduced pressure. Subsequent slow fractionation through a spinning-band column, first at atmospheric pressure and then under vacuum, yields a solvent fraction and a fraction (9 g.) containing bicyclo-[4.2.0]octene - 8 (80%) and bicyclo[4.2.0]octene - 7 (20%). The former is identified by n.m.r. and by its pyrolysis to 1-vinylcyclohexene.

The pyrolysis is effected by adding the mixture containing 80% bicyclo[4.2.0]octene-8 and 20% bicyclo[4.2.0]octene-7 to o-dichlorobenzene (100 ml.) and refluxing for 15 minutes under nitrogen, at atmospheric pressure. The n.m.r. analysis shows quantitative conversion of the bicyclo[4.2.0]octene-8 to 1-vinylcyclohexene. The hydrocarbon mixture is distilled off from the solvent using a spinning-band column. Redistillation yields a first fraction (2 g.) containing mostly bicyclo[4.2.0]octene-7 and a second fraction of pure 1-vinylcyclohexene (6 g). Removal of the solvent yields a polymeric residue (1 g.).

EXAMPLE 2

This example shows the preparation of 1-vinylcyclohexene directly from bicyclo[4.2.0]octene-7. The latter is swept through a reactor held at 250° using nitrogen as carrier gas. The reactor consists of a coiled Pyrex tube, 150 cm. long and 10 mm. in diameter, packed with alumina (e.g., Alcoa F–10, 8–10 mesh). It is mounted vertically in a furnace having an isothermal zone of about 50 cm., and flushed with nitrogen prior to the experiment. The temperature is stabilized and bicyclo[4.2.0]octene-7 is introduced drop-wise (1 ml./min.). The effluent is passed through a Dry Ice-acetone trap where the product is collected and then recycled. After four passages through the reactor, the starting material has been 85% converted to 1-vinylcyclohexene. Distillation then yields a first fraction which contains bicyclo[4.2.0]octene-7 and 1-vinylcyclohexene in equimolar amounts, and which is recycled, and a second fraction of pure 1-vinylcyclohexene.

What is claimed is:

1. The process for the preparation of 1-vinylcyclohexene which comprises contacting bicyclo[4.2.0]octene-7 with an isomerization catalyst at a temperature of from 0° C. to 300° C., to isomerize the said bicyclo[4.2.0]-octene-7 to bicyclo[4.2.0]octene-8, and pyrolyzing the latter at a temperature of 100° C. to 300° C. to obtain 1-vinylcyclohexene.

2. Process as in claim 1 in which the steps of isomerization and pyrolysis are conducted subsequently in the same vessel without the removal of material after isomerization.

3. Process as in claim 1 in which the products of the first stage of isomerization are subjected to purification step to remove catalyst.

References Cited

UNITED STATES PATENTS

| | | | |
|---|---|---|---|
| 3,526,672 | 9/1970 | Boyer | 260—666 B |
| 3,538,172 | 11/1970 | Hochmuth et al. | 260—666 B |
| 3,414,629 | 12/1968 | McCall et al. | 260—666 B |

OTHER REFERENCES

Stapp et al., J. Amer. Chem. Soc., vol. 80, pp. 3006–3009, 1965.

Srinivasau, J. Amer. Chem. Soc., vol. 84, p. 4141, 1962.

DELBERT E. GANTZ, Primary Examiner

V. O'KEEFE, Assistant Examiner

U.S. Cl. X.R.

260—666 B, 666 Py

PO-1050
(5/69)

UNITED STATES PATENT OFFICE
CERTIFICATE OF CORRECTION

Patent No. 3,660,342  Dated May 2, 1972

Inventor(s) John C. Duggan

It is certified that error appears in the above-identified patent and that said Letters Patent are hereby corrected as shown below:

IN THE SPECIFICATION

Column 2, line 13 -- $Rh[(C_6H_5)_3P]_3$ should read -- $RhI[(C_6H_5)_3P]_3$ - see spec. page 4, line 1.

Signed and sealed this 10th day of July 1973.

(SEAL)
Attest:

EDWARD M. FLETCHER, JR.
Attesting Officer

Rene Tegtmeyer
Acting Commissioner of Patents